US00RE34534E

United States Patent [19]

Staats

[11] E Patent Number: Re. 34,534

[45] Reissued Date of Patent: Feb. 8, 1994

[54] DIRECT POWER VENTED WATER HEATER

[75] Inventor: Charles W. Staats, Yeadon, Pa.

[73] Assignee: Bradford-White Corporation, Ambler, Pa.

[21] Appl. No.: 670,712

[22] Filed: Mar. 18, 1991

Related U.S. Patent Documents

Reissue of:

[64] Patent No.: 4,867,106
Issued: Sep. 19, 1989
Appl. No.: 208,846
Filed: Jun. 17, 1988

U.S. Applications:

[63] Continuation of Ser. No. 936,478, Nov. 26, 1986, abandoned, which is a continuation of Ser. No. 742,605, Jun. 7, 1985, Pat. No. 4,762,919.

[51] Int. Cl.[5] ..... F22B 5/00

[52] U.S. Cl. ..... 122/13.1; 122/17; 122/156; 122/162; 122/158; 110/162

[58] Field of Search ..... 122/13 R, 14, 17–19, 122/156–158, 168, 367 A; 110/162

[56] References Cited

U.S. PATENT DOCUMENTS

| | | | |
|---|---|---|---|
| Re. 31,256 | 5/1983 | Schmidt | 126/307 A |
| 1,643,859 | 9/1927 | Sanvage . | |
| 1,707,281 | 4/1929 | Sanvage | 110/162 |
| 1,713,442 | 5/1929 | Motcovich | 110/162 |
| 1,826,748 | 10/1931 | Delamere | 110/162 |
| 1,829,334 | 10/1931 | Birtch | 122/14 |
| 1,859,745 | 5/1932 | Morley . | |
| 1,935,919 | 11/1933 | Ronstrom | 122/16 |
| 2,348,901 | 5/1944 | Handley . | |
| 2,348,950 | 5/1944 | Anderson . | |
| 2,361,635 | 10/1944 | Koppel . | |
| 2,443,359 | 6/1948 | Newhouse | 122/17 |
| 2,487,689 | 11/1949 | Black | 98/DIG. 7 |
| 2,563,817 | 8/1951 | Carson . | |
| 2,730,943 | 1/1956 | Klein | 98/DIG 7 |
| 2,830,622 | 4/1958 | Roberts et al. | 98/DIG. 7 |
| 2,847,953 | 8/1958 | Ernst . | |
| 2,877,834 | 3/1959 | Campbell . | |
| 3,280,773 | 10/1966 | English . | |
| 3,280,774 | 10/1966 | English . | |
| 3,490,420 | 1/1970 | Kramer . | |
| 3,492,972 | 2/1970 | McLaren | 122/17 |
| 3,578,490 | 6/1971 | Martin | 110/162 |
| 3,601,099 | 8/1972 | Vaillant et al. | 122/494 |
| 3,759,230 | 9/1973 | Cooksley | 122/156 |
| 3,782,303 | 1/1974 | Pfister et al. | 110/162 |
| 4,102,632 | 7/1978 | Hastings | 432/3 |

(List continued on next page.)

FOREIGN PATENT DOCUMENTS

| | | |
|---|---|---|
| 1036692 | 8/1978 | Canada . |
| 2502063 | 8/1975 | Fed. Rep. of Germany . |
| 3224009 | 2/1983 | Fed. Rep. of Germany . |
| 372147 | 3/1907 | France . |
| 1016381 | 11/1952 | France . |
| 1289923 | 11/1962 | France . |
| 2211110 | 12/1974 | France . |
| 7404175 | 3/1974 | Netherlands . |
| 7603212 | 3/1976 | Netherlands . |
| 1224354 | 3/1971 | United Kingdom . |
| 2014286 | 8/1979 | United Kingdom . |
| 2026622 | 2/1980 | United Kingdom . |

*Primary Examiner*—Henry C. Yuen
*Attorney, Agent, or Firm*—Austin R. Miller

[57] ABSTRACT

A water heater having an insulated water tank with a cold water inlet line, a hot water outlet line and a baffled flue pipe extending vertically through the tank is provided. The flue pipe extends from a combustion chamber housing a burner located beneath the tank, to a flue gas collection chamber positioned above the tank. The collection chamber is in fluid communicatioon with a blower and a flue gas exhaust line for conveying the flue gases through the exhaust line to a direct through-the-wall vent. Control apparatus is provided for sensing the temperature of the water in the tank and controlling the amount of fuel supplied to the burner in response thereto. The control apparatus turns on the blower when fuel is being supplied to the burner and turns off the blower when no fuel is being supplied to the burner.

9 Claims, 7 Drawing Sheets

U.S. PATENT DOCUMENTS

| | | | |
|---|---|---|---|
| 4,185,769 | 1/1980 | Nezworski . | |
| 4,204,832 | 5/1980 | Miller | 110/162 |
| 4,205,631 | 6/1980 | Parker | 110/162 |
| 4,254,759 | 3/1981 | Schmidt | 126/307 A |
| 4,262,608 | 4/1981 | Jackson | 110/162 |
| 4,303,042 | 12/1981 | Sumiyoshi | 122/17 |
| 4,356,794 | 11/1982 | Bouman et al. | 122/158 |
| 4,357,909 | 11/1982 | Kagoshima | 122/183 |
| 4,424,792 | 1/1984 | Shimek et al. | 126/80 |
| 4,452,280 | 6/1984 | Werner | 98/DIG. 7 |
| 4,485,746 | 12/1984 | Erlandsson | 110/162 |
| 4,487,137 | 12/1984 | Horvat et al | 110/160 |
| 4,531,509 | 7/1985 | Wilhelm, Jr. | 122/17 |

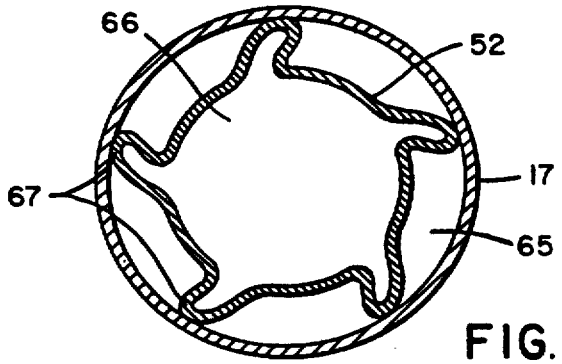
FIG. 5
FIG. 6
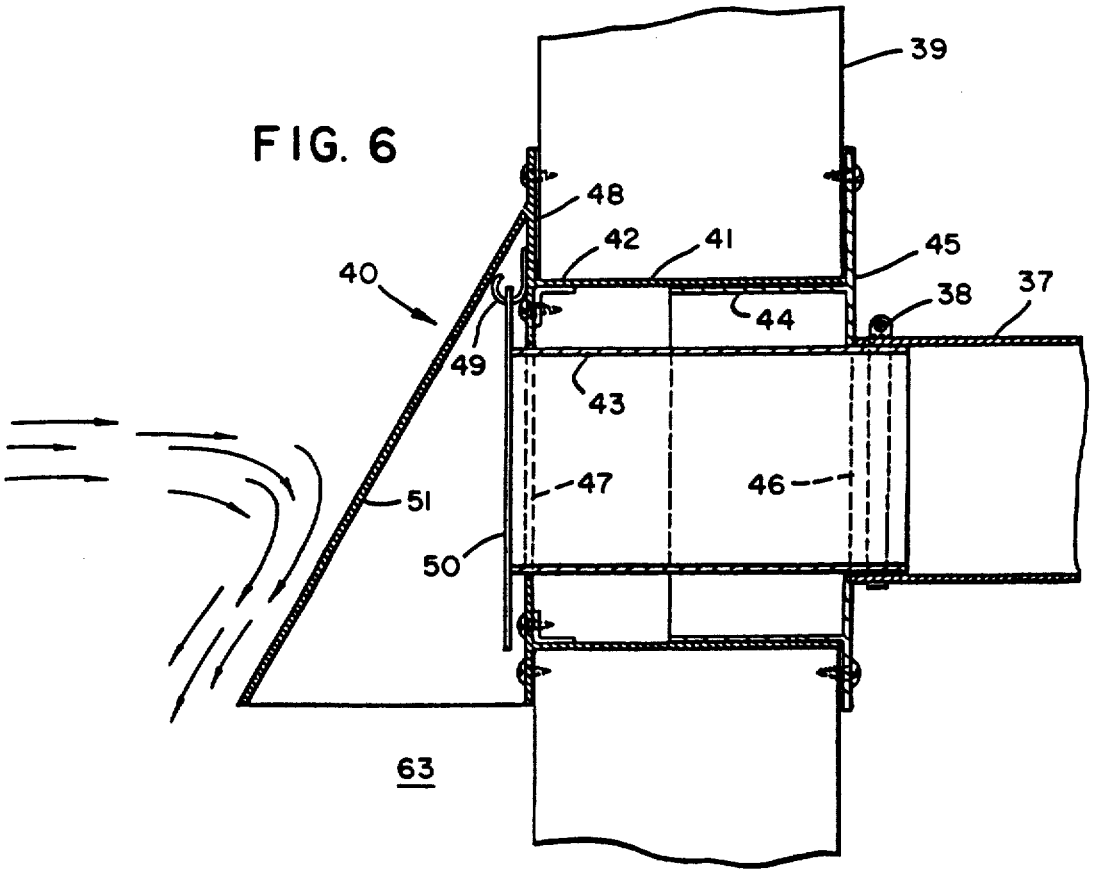

DIRECT POWER VENTED WATER HEATER

Matter enclosed in heavy brackets [ ] appears in the original patent but forms no part of this reissue specification; matter printed in italics indicates the additions made by reissue.

This application is a continuation of application Ser. No. 936,478, filed Nov. 26, 1986, now abandoned, which is a continuation of Ser. No. 742,605, filed Jun. 7, 1985, now U.S. Pat. No. 4,762,919.

BACKGROUND OF THE INVENTION

The present invention relates generally to a power-vented water heater. The power venting is provided by a blower which induces a draft for the flue gases generated by the water heater. The heater utilizes a direct through-the-wall vent design thereby obviating the need for a chimney. The heater also utilizes a flexible flue gas exhaust line providing the advantage of installation flexibility.

Description of the Prior Art

U.S. Pat. No. 4,262,608 to Jackson discloses a water heater having a draft hood and a flue pipe leading to an air manifold. This patent further discloses a blower positioned immediately downstream from the manifold. The blower has a dual function, namely to force the exhaust gases out through the exhaust pipe and simultaneously bring in fresh outside air through an intake pipe. This type of system is generally referred to as a "balanced flue" system.

U.S. Pat. No. 4,424,792 to Shimek et al discloses a wood burning furnace utilizing a direct vent design. The direct vent utilizes an induced draft blower installed on the exterior of the wall which operates to draw flue gases through the flue pipe. This patent further discloses a pivoting cap at the vent outlet.

U.S. Pat. No. 4,424,792 is directed primarily to a device for cooling the hot flue gases before they pass through the exterior wall by mixing them with cool outside air just before venting.

Other prior art patents include U.S. Pat. Nos. 3,601,099; 1,859,745; 3,759,230; 2,563,817; 4,357,909; 1,935,919; 1,643,859; 1,713,442; 1,826,748; 2,348,950; 3,280,774; 4,303,042; 3,492,972; 4,487,137 Re. 31,256; 4,254,759; 3,782,303.

The water heaters of the prior art have typically relied upon the natural draft of the hot flue gases, rising through the flue pipe(s) of a water heater and being vented into a chimney. Because these gases were warmer than the surrounding air, they tended to naturally rise. However, with this type of design, the positioning of the water tank was somewhat limited since for practical reasons it had to be placed close to the chimney. Thus; it is an object of the present invention to provide a water heater which need not be vented into a chimney, thereby providing greater installation flexibility.

It is another object of the present invention to provide a water heater venting design which needs no chimney. This is important from several cost reduction standpoints. First, in new house construction, homes may be constrtucted without a chimney, thereby significantly lowering the cost of a new home. Secondly, during the so called "gas moratorium" of the 1950's and 1960's, many houses were built for all-electric heating, and therefore have no chimney. Now that natural gas has beome comparatively much less expensive, there is a desire by many "all-electric" home owners to convert to natural gas heating. Thus, it is an important object of the present invention to provide a water heater flue gas venting design adaptable to conversions from all electric heating.

It is a further object of the present invention to provide a direct through-the-wall vent design adaptable to high velocity outside winds.

It is another important object of the present invention to provide a flexible connector pipe between the water heater and the direct vent which is air tight, flexible, and which operates at a lower temperature thereby reducing the risk of burn injuries, and obviating condensation problems.

These and other important objects of the present invention will become readily apparent from the description appearing hereinafter.

SUMMARY OF THE INVENTION

A direct power vented water heater having a collection chamber prositioned above the water tank, the collection chamber being in fluid communication with an exhaust blower and a flue gas exhasut line, is provided. The blower conveys the flue gases through the exhaust line to a direct through-the-wall vent. Water heater control means are provided for sensing the temperature of the water in the tank and controlling the amount of fuel supplied to the burner in response thereto. The control means activates the exhaust blower when the fuel is being supplied to the burner but deactivates the exhaust blower when the fuel supply to the burner is cut. The control means also interupts the supply of fuel to the burner in the event that either a total or partial blockage of the flue gas exhaust occurs.

BRIEF DESCRIPTION OF THE DRAWINGS

FIG. 5 is a sectional view of the baffled flue pipe illustrated in FIG. 4 taken along line V—V.

FIG. 6 is a side sectional view of a direct through-the-wall vent according to one embodiment of the present invention.

Figure 1:
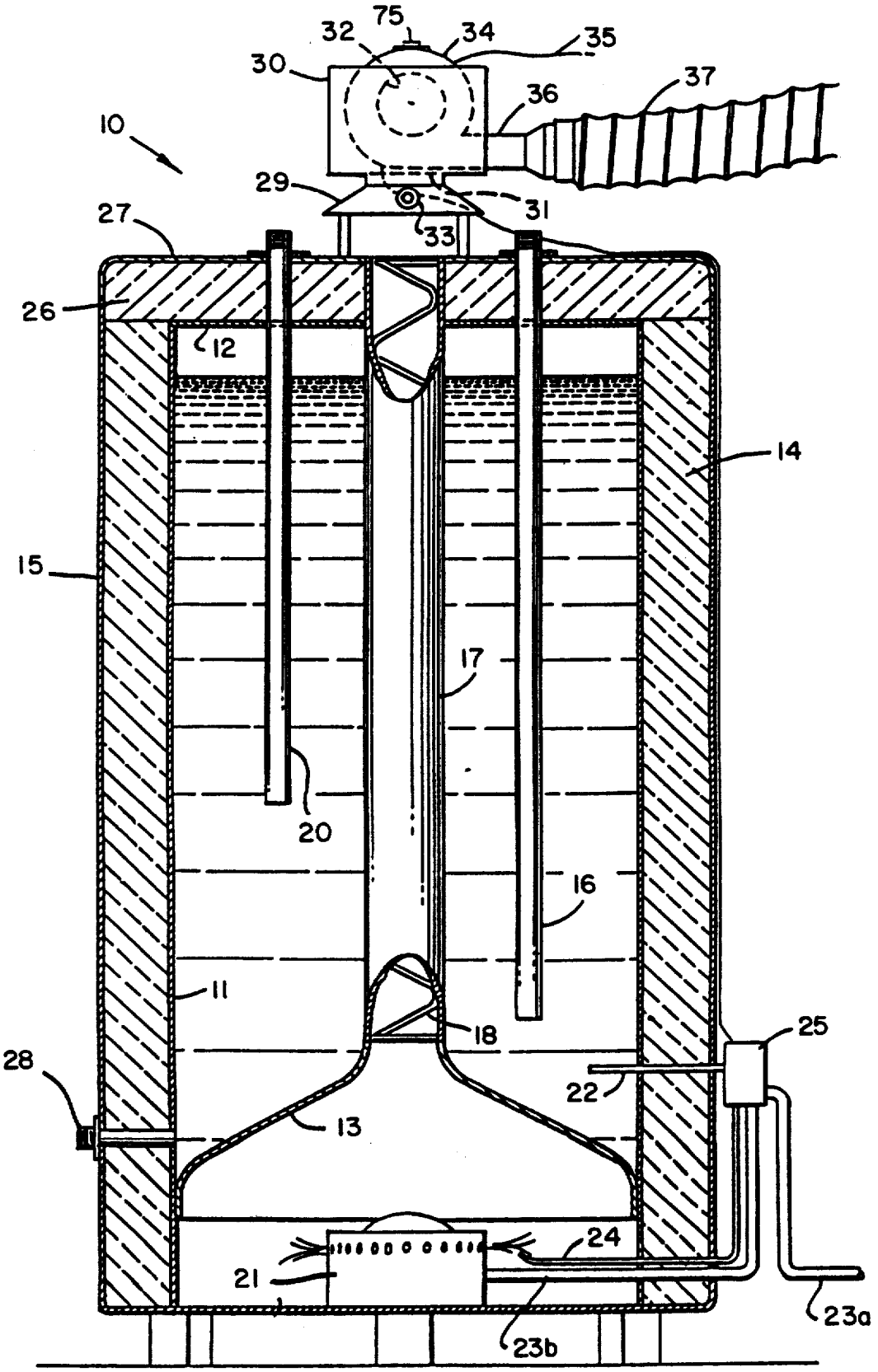
FIG. 1 is a side view, shown partly in section, of a water heater illustrating one embodiment of the present invention.

Although specific forms of apparatus embodying the invention have been selected for illustration in the drawings, and although specific terminology will be resorted to in describing those forms in the specification which follows, their use is not intended to define or to limit the scope of the invention, which is defined in the appended claims.

DESCRIPTION OF THE PREFERRED EMBODIMENTS

Referring to the drawings wherein like reference numerals refer to the same features in the several drawings, and especially referring to FIG. 1, there is shown a water heater 10. Heater 10 comprises a water tank 11 having a tank head 12 and a tank bottom 13. Extending vertically between tank head 12 and bottom 13 and passing through the interior of tank 11 is flue pipe 17 having internal baffling 18.

Figure 9:
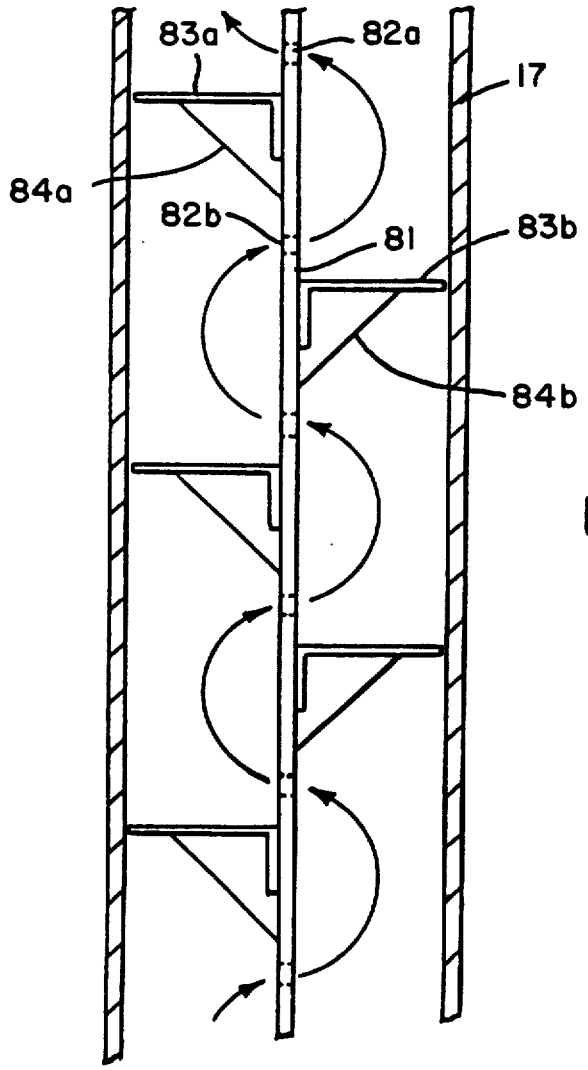
FIG. 9 is a side view, shown partly in section, of a removable flue pipe baffle which may be used in certain embodiments of the present invention.

An alternate baffle construction which may be utilized in the embodiment of water heater 10 illustrated in FIG. 1 is shown in FIG. 9. In this alternate embodiment, baffle 80 comprises a divider 81 having a length corresponding to the length of flue pipe 17 and a width which is substantially the same as the inner diameter of flue pipe 17. Thus, when baffle 80 is placed within flue pipe 17, divider 81 divides the interior of flue pipe 17 into two sections. Attached to divider 81 are a plurality of plates 83 having an L-shaped cross section and having a semicircular shape so that the outer edge of plate 83 is in substantially continuous contact with the inner surface of flue pipe 17. Each of the plates 83 is fixedly attached to divider 81 and rests against a triangular shaped support 84. Divider 81 is provided with a plurality of openings 82 between adjacent plates 83. All of divider 81, plates 83 and supports 84 are typically constructed of sheet metal. Baffle 80 is simply placed within flue pipe 17 by inserting in an upward direction. The bottom sides of plates 83 are preferably not fixedly attached to the top sides of supports 84. In this way, baffle 80 can be easily removed from flue pipe 17 for cleaning purposes simply by pulling out divider 81 in a downward direction. When the baffle 80 is in place within flue pipe 17, the flue gases passing upwardly within pipe 17 will follow the twisted path as shown by the arrows in FIG. 9.

Surrounding the side walls of tank 11 is an insulating layer 14 typically composed of fiberglass or polyurethane foam. Surrounding insulation layer 14 is outer jacket 15. Positioned beneath tank bottom 13 is combustion chamber 20 housing gas burner 21, a pilot line 24 and gas supply line 23. A gas valve and a thermocouple circuit (not shown) is provided within control means 25 in a known manner. An emersion rod 22 is provided in order to measure the temperature of the water in the tank 11. A thermostat is provided within the control means 25, as will be described in more detail hereinafter, to regulate the operation of the burner 21.

Positioned above tank head 12 is an insulating layer 26 and a jacket top 27. Draft diverter 29 is positioned above jacket top 27 and centered over, but spaced apart from, the top end of flue pipe 17. Diverter 29 is connected to collector box 30 at opening 31. Collector box 30 is a container typically constructed of sheet metal. Thus, diverter 29 connects with opening 31 to direct the flue gases rising from flue pipe 17 into collector box 30.

Blower 34 is connected to collector box 30 through opening 32. When activated, blower 34 draws the gases within collector box 30 through opening 32 and blows them through the blower outlet 36 into flexible conduit 37. Blower 34 is typically an electric powered blower having a power cord 35.

Provided on the draft hood 29 is a thermostat 33 which is operatively connected to the blower 34 by means of the control means 25. In the event that there is a blockage in the flue gas exhaust line downstream from the draft hood 29, the rising flue gases will spill out from under the draft hood and be sensed by theremostat 33. Thermostat 33 is typically set to signal control means 25 in the event the sensed temperature rises above about 180° F. Thermostat 33, sensing the spillage of the hot flue gases from underneath the draft hood 29, will activate control means 25 to shut off the supply of fuel to burner 21. In addition, thermostat 33 will also deactivate blower 34 at this time.

Also provided within the shourd of blower 34 is a second thermostat 75 which is also typically set to signal control means 25 in the event that the temperature rises above about 180° F. This dual (i.e. thermostats 33 and 75) safety circuit system is especially preferred from an operating standpoint. In the event that there is either a total blockage of the flue gas exhaust, or if the blower 34 fails to operate, thermostat 33 quickly senses the hot flue gases spilling out from under diverter 29 and quickly signals control means 25 to cut off the supply of gas to burner 21. In the alternative, in the event of only a partial blockage of the flue gas exhaust line, thermostat 75 is the first to sense the rising flue gas temperature and quickly signals control means 25 to cut off the supply of gas to burner 21.

Turning now to FIG. 6 of the drawings, there is shown an embodiment of a direct through-the-wall vent which is connected to the downstream end of flexible pipe 37. The term "through-the-wall" encompases direct vents of the type which convey flue gases from an interior portion of a building or sturcture to an exterior portion of a building or structure for venting. Thus, for example, the term "through-the-wall" encompasses walls of all types, regardless of structure or composition, as well as other structures such as roofs and ceilings, as long as one side of the structure faces an interior space and the other side of the structure faces an exterior space into which the flue gases will be vented. In FIG. 6 there is shown a typical through the wall vent 40 mounted within a cylindrical hole 41 passing through wall 39. Within hole 41 is positioned a metal sleeve 42. An inner sleeve 44 having a face plate 45 is slid into the interior end of sleeve 42. Furthermore, face plate 45 has a circular hole 46 therein through which extends the interior end of conduit 43. Similarly, sleeve 42 has an exterior face plate 48 with a circular hole 47 through which the exterior end of conduit 43 extends., In this way, conduit 43 is annularly spaced within sleeve 42. Face plates 45, 48 are secured to the wall 39 by conventional means. Flexible pipe 37 is secured to the interior end of conduit 43 with a clamp 38.

Hingedly mounted on face plate 48 is flapper plate 50. A hinge 49 is provided for this purpose. Flapper plate 50 normally rests in a vertical position thereby acting as a damper when blower 34 is in an off cycle. However, when flue gases are flowing through flexible pipe 37 and conduit 43, the flapper plate 50 swings open to allow venting of the flue gases. A stationary plate 51 may also be provided in order to provide better protection against back flow in the conduit 43 and flexible conduit 37 in the event of high winds and the like. In the event that winds are blowing against the stationary plate 51 as indicated by the arrows, the flow of air is directed downwardly upon striking the angled plate 51. This downward flow of air causes a low pressure region 63 to form just below plate 51. This low pressure region 63 helps to draw the flue gases out of the space behind plate 51. Thus, stationary plate 51 assures proper ventilation of the flue gases even in the case of high velocity winds directed into the vent 40.

Flexible pipe 37 is preferably constructed from a wire reinforced EPDM (ethylene propylene diene monomer) rubber, which is airtight and both bendable and extendable. Flexible pipe 27 preferably has a continuous operating temperature rating above 200° F., more preferably above 250° F. Although the length of the flexible pipe 37 is not limited to any particular range, in most applications a length within the range of 6–15 feet is sufficient.

Because draft diverter 29 is spaced apart from the top end of flue pipe 17, the suction created by blower 34 draws not only the hot flue gases into collector box 30 but also draws some of the surrounding room air under diverter 29 into collector box 30. Thus, the hot flue gases are "diluted" by mixture with the ambient air. After this dilution, the gases pumped through flexible tube 37 are typically in the range of about 150°–180° F. At such low temperatures, condensation problems within flexible pipe 37 are practically elminated. In addition, there is a much less likelihood of burn injuries to persons coming into contact with flexible pipe 37 because of this temperature dilution.

Figure 2:
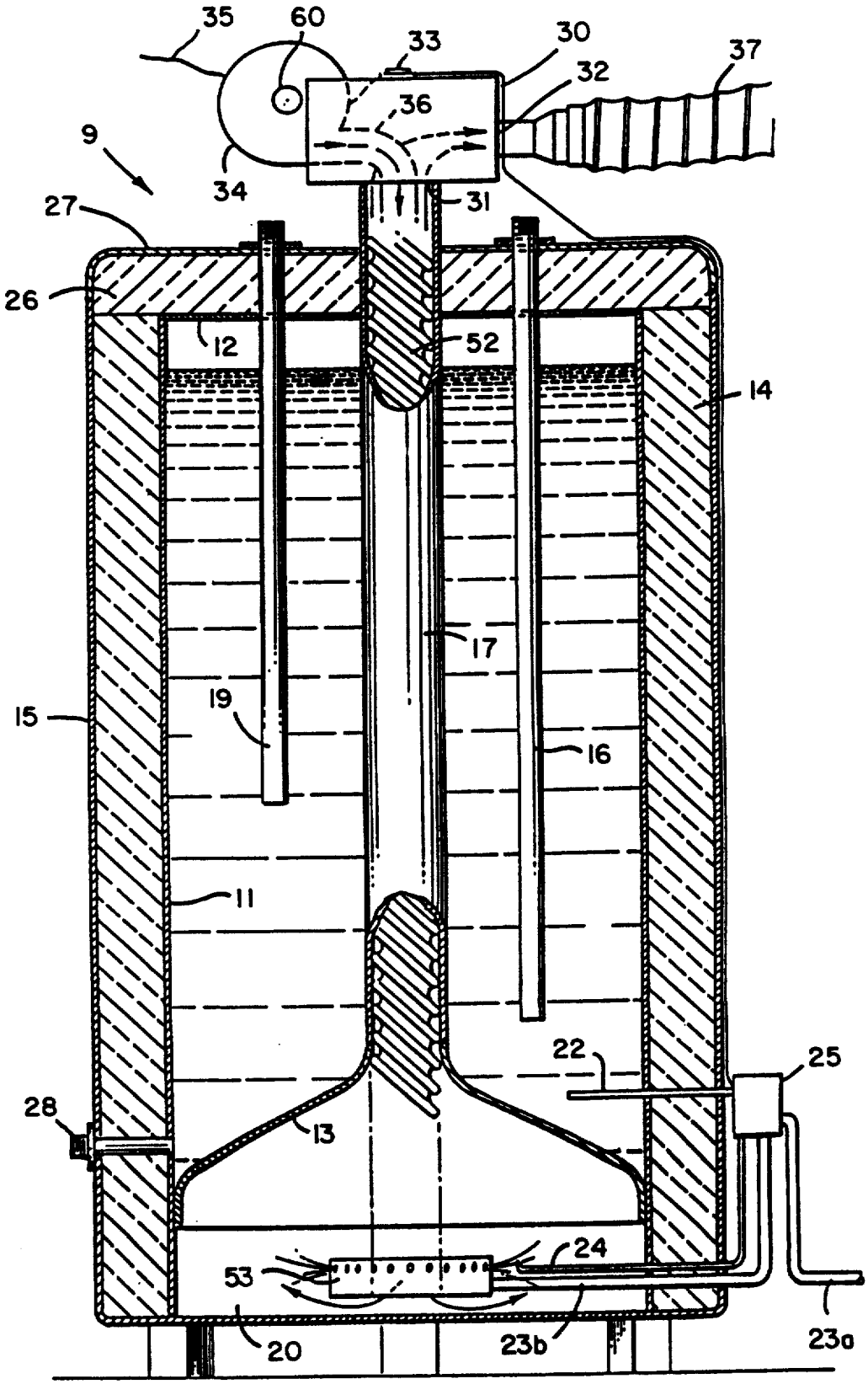
FIG. 2 is a side view, shown partly in section of a water heater illustrating a second embodiment of the present invention.
Figure 4:
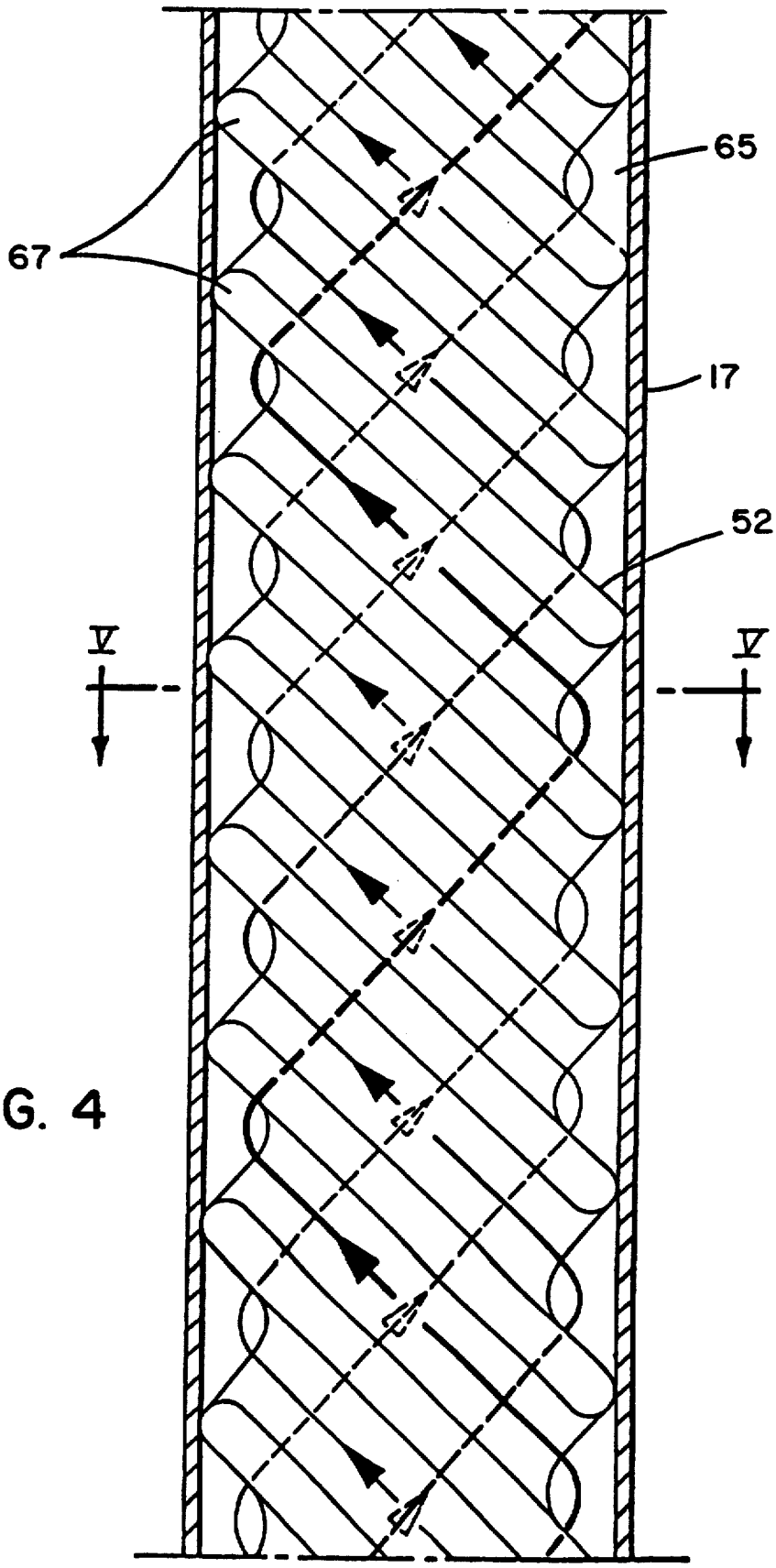
FIG. 4 is a side view, shown partly in section of one baffled flue pipe design with may be utilized with certain embodiments of the present invention.

Referring now to FIGS. 2, 4 and 5, there is illustrated a second embodiment of the present invention wherein the blower 34 supplies combustion air to burner 53 while at the same time blowing the flue gases through flexible pipe 37 and out the direct vent 40. The heater 9 illustrated in FIG. 2 has a substantially airtight combustion chamber 20. Combustion air for burner 53 is provided by blower 34 and baffled tube 52. Blower outlet 36 is fluidly connected to the interior space 66 within baffled tube 52. When the blower is on, air is drawn from the space surrounding blower 34 and blown through the interior 66 of baffled tube 52. Baffled tube 52 extends into the lower portion of combustion chamber 20. Burner 53, having a "donut-shaped"0 configuration, wraps around the lower end of tube 52. Combustion air flows out the lower end of tube 52 as shown by the arrows and mixes with the fuel gas supplied to burner 53 allowing combustion to take place. Because chamber 20 is provided with appropriate seals to make it substantially airtight, the combustion flue gases are forced to flow upwardly within flue pipe 17 through the segmented exterior space 65.

The configuration of baffled tube 52 within flue pipe 17 is clearly illustrated in FIGS. 4 and 5. The baffled tube 52 is provided with a plurality of spiral ridges 67 along its circumference. Ridges 67 are in contact with the inside of flue pipe 17, thereby dividing the space 65 into a plurality of spiral pathways.

As the cool room air is forced through the interior space 66 it is prewarmed by countercurrent flow with the hot combustion flue gases passing upwardly through the segmented space 65. This allows for more efficient combustion of the fuel gases at burner 53.

At the top end of flue pipe 17, the exterior space 65 is open to the interior of collector box 30 through opening 31. Collector box 30 also has opening 32 connected to flexible pipe 37. In this way, the hot flue gases pass from space 65 into collector box 30 and finally into flexible pipe 37 whereby they flow out a direct vent 40.

Figure 8:
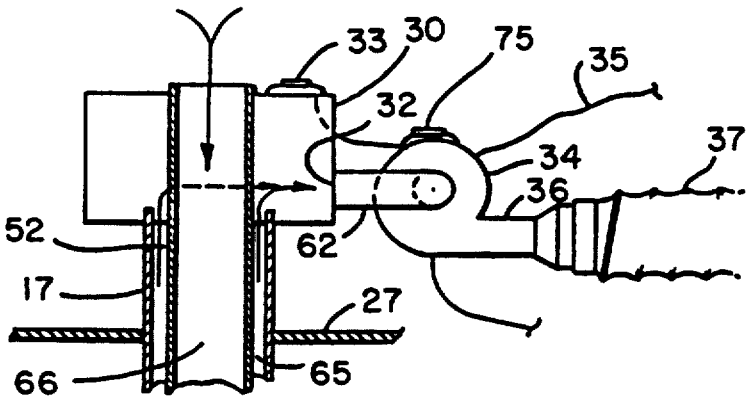
FIG. 8 is a side view, shown partly in section, of an alternate flue pipe, collector box and blower assembly which may be used in place of the assembly illustrated in FIG. 2.

FIG. 8 illustrates an alternate design of the collector box 30, flue pipe 17 and blower 34 which may be used with the heater 9 illustrated in FIG. 2. In this alternate design, blower 34 is positioned downsteam from collector box 30 and blows the flue gases out the blower outlet 36 through flexible pipe 37. A pipe 62 is provided between opening 32 and blower 34. Thus, blower 34 provides suction to convey the flue gases from exterior space 65 into collector box 30, through pipe 62 and finally through blower 34 and flexible pipe 37. In this embodiment, tube 52 extends all the way through collector box 30 and opens at the top thereof. Because the combustion chamber 20 is airtight, the operation of blower 34 causes surrounding room air to be conveyed down the interior space 66 as shown by the arrows in order to provide combustion air to the burner 53.

Figure 3:
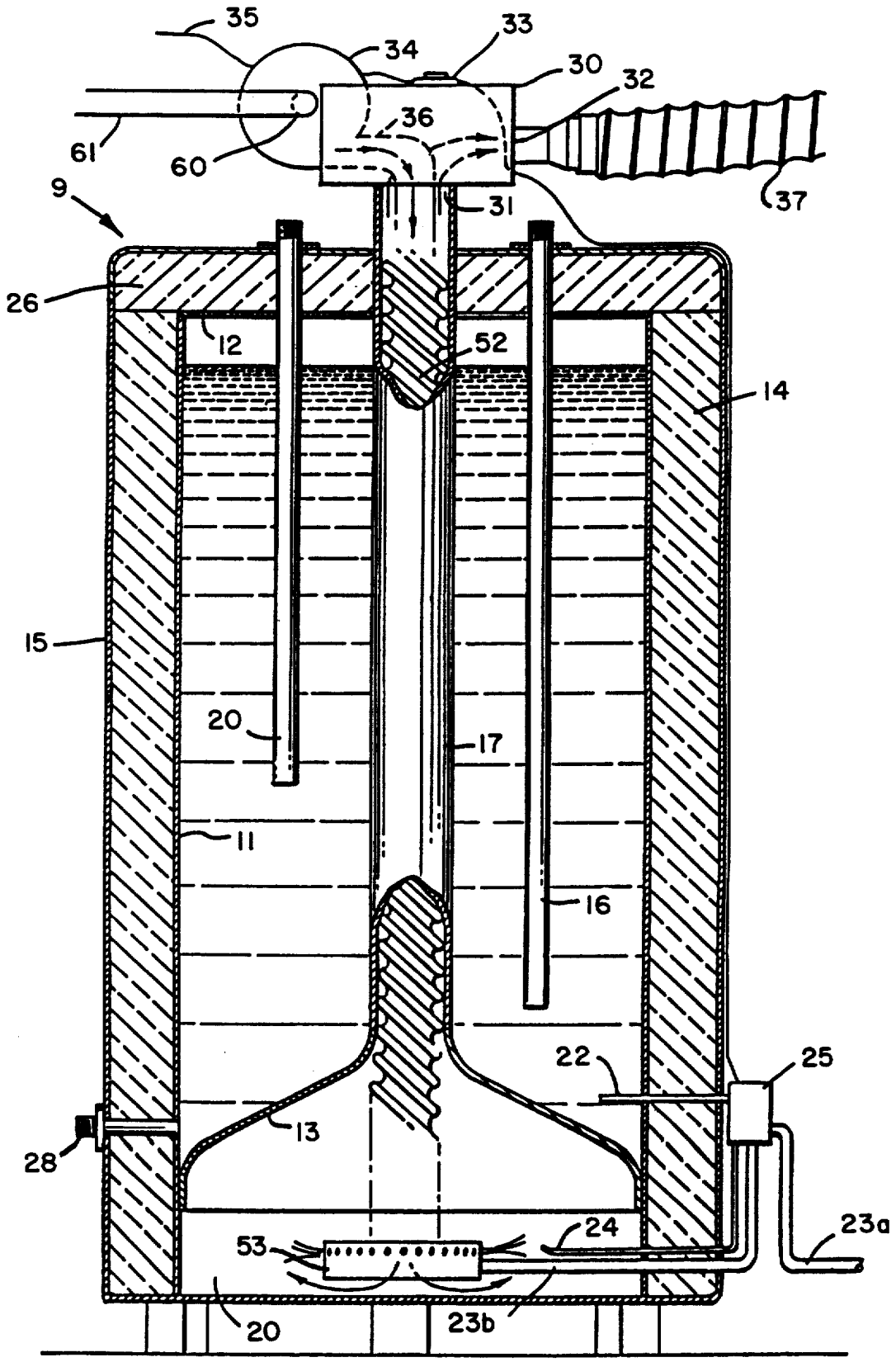
FIG. 3 is a side view, shown partly in section of a water heater illustrating a third "balanced flue" embodiment of the present invention.

FIG. 3 illustrates a "balanced flue" version of the water heater 9 illustrated in FIG. 2. In the balanced flue design, blower 34 is provided with an air inlet pipe 61 which extends to a space outside the building. In this way, combustion air is drawn by blower 34 from the outside of the building through inlet pipe 61 and blown into the interior space 65. In this design, the water heater 9 is totally "closed" with respect to the room environment since the combusution air is drawn from outside the building and the flue gases are vented directly outside the building.

Figure 7:
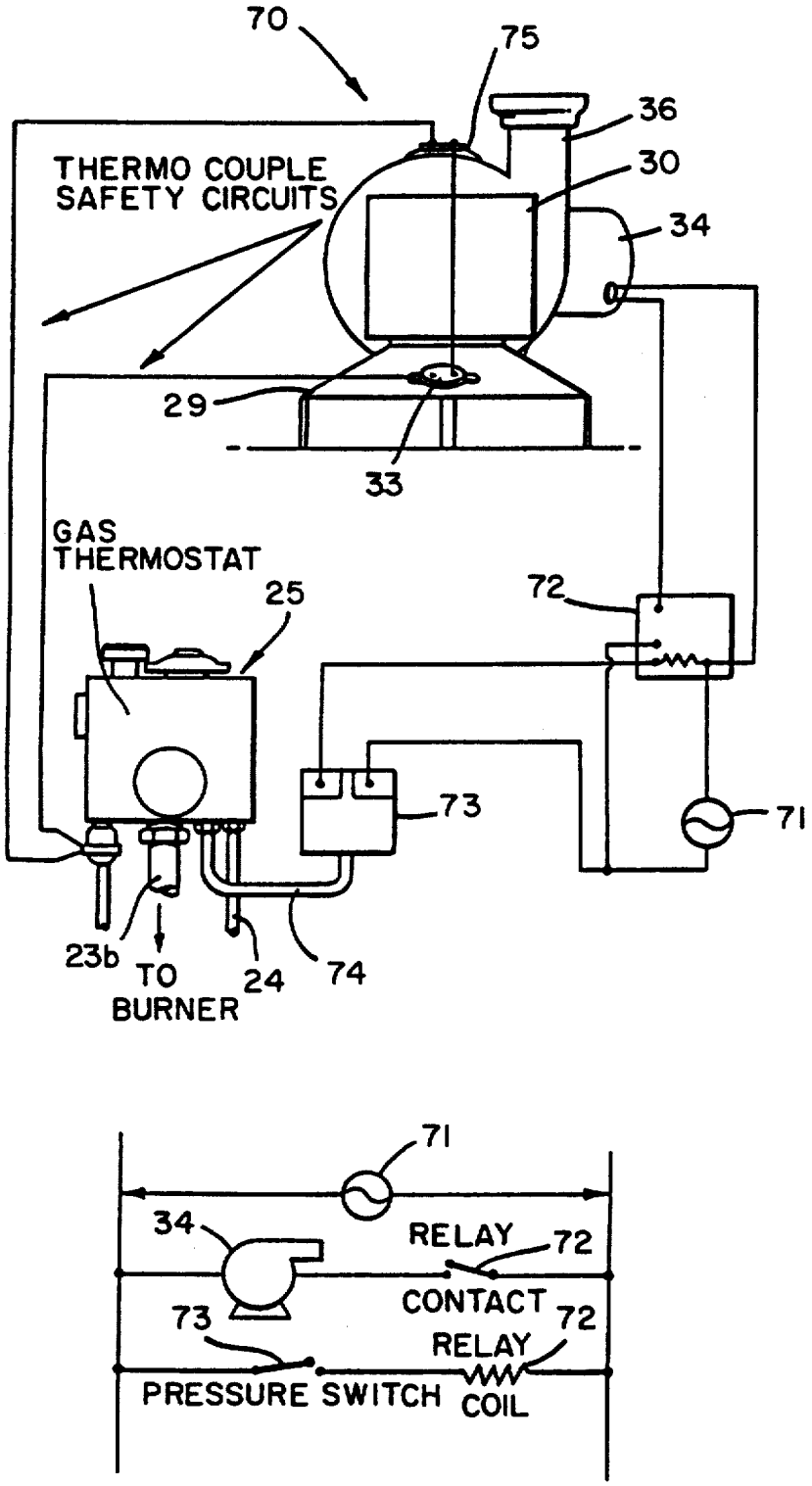
FIG. 7 comprises two schematic wiring diagrams of one embodiment of the burner and blower control apparatus utilized in the present invention.

Referring to FIG. 7, there is illustrated schematically one embodiment of a blower and burner control circuitry which may be utilized with the present invention. There is illustrated a wiring diagram 70 as well as a ladder circuit diagram. Power is provided by a 115 power supply 71. A relay contact 72 is provided to control the supply of power to blower 34. Thermostat 75, within the shroud of blower 34, provides an advance sensing control in the event that there is a partial blockage in the flow of the flue gases downstream from blower outlet 36. Both thermostat 75 and thermostat 33 are operatively connected to control means 25 to shut off the flow of gas to the burner in the event of any blockage or restriction of the outward flow of flue gases through flexible pipe 37.

Control means 25 is operatively connected to a pressure switch 73 through a gas line 74. In the event that the thermostat within control means 25 calls for the burner to be activated, control means 25 opens a valve thereby causing gas to flow through gas supply line 23b as well as gas line 74. The flow of gas through line 74 causes pressure switch 73 to connect thereby supplying power to blower 34. This ensures that blower 34 will be operating when the burner is turned on.

Similarly, when the thermostat indicates that the temperature of the water within tank 11 has reached a desired level, control means 25 shuts off the supply of gas to gas supply line 23b and gas line 74. Thus, pressure switch 73 is disconnected and interrupts the supply of power to blower 34.

Although this invention has been described in the specification with reference to specific forms thereof, it will be appreciated that a wide variety of equivalents may be substituted all without departing from the spirit and scope of the invention, which is defined in the appended claims.

I claim:

1. A water heater having exhaust means *for exhausting flue gases from an interior space to an exterior space and* adapted for installation through a through-the-wall vent formed in an upstanding wall, said *water* heater having an insulated water tank with a cold water inlet line, a hot water outlet line and a baffled flue pipe extending upwardly through the tank, said flue pipe opening at one end thereof upon a combustion chamber located beneath the tank, said combustion chamber containing a fuel burner, and the other end of said flue pipe opening at the top of the tank upon flue gas collection and exhaust means said collection and exhaust means *including a flue gas collector, a flue gas exhaust line and blower means connected to the water heater and being located* [comprising a collection chamber spaced] above said flue pipe, [and a flue gas exhaust line, said flue gas exhaust line comprising an airtight, flexible and extendable high temperature accordion pleated conduit with a continuous operating temperature rating above about 200° F.] said [exhaust line having] blower means [conneced to draw] *drawing* room air *from said interior space* into said [collection chamber] *collector* and said exhaust line along with flue gases *to dilute the flue gases and substantially eliminate formation of condensation in the exhaust line* and to convey the *diluted* flue gases at a reduced temperature *by causing the diluted flue gases to flow along said exhaust line to* said through-the-wall vent *and then to said exterior space,* and including control means for sensing the temperature of the water in the tank and controlling the amount of fuel supplied to the burner in response thereto, said control means activating and deactivating the blower means and including means for sensing *either when said exhaust line is blocked or when flue gases spill outwardly of said flue gas collector* [the temperature of said reduced temperature flue gases] and for interrupting the flue supplied to the burner in response thereto.

2. The water heater as defined in claim 1, wherein the direct through-the-wall vent comprises:

a. an insulated conduit for conveying the flue gases from the flue gas exhaust line through the wall; *and* b. a stationary [face plate] *blocking member* which blocks direct horizontal access to the vent[; and c. a hinged closure plate for blocking the conduit when no gases flow therethrough] .

3. The water heater as defined in claim 1 wherein said [flexible conduit] *exhaust line* comprises a wire reinforced ethylene propylene diene monomer.

4. A water heater having exhaust means *for exhausting flue gases from an interior space to an exterior space and* adapted for installation through a through-the-wall vent formed in an upstanding wall, said *water* heater having an insulated water tank with a cold water inlet line, a hot water outlet line and a baffled flue pipe extending upwardly through the tank, said flue pipe opening at one end thereof upon a combustion chamber located beneath the tank, said combustion chamber containing a [flue] *fuel* burner, and at its other end upon flue gas collection means, said collection means comprising a [draft hood] *flue gas collector connected to the top of the water heater* wherein flue gases and air mix, said [draft hood] *flue gas collector* being in fluid communication with a flexible flue gas exhaust line and blower means *positioned at the top of the water heater* for drawing cooler ambient air *from the inner space* through said [draft hood] *collector to dilute the flue gases and substantially eliminate formation of condensation in the exahust line* and [conveying] *to cause* the *diluted* flue gases *to flow* through the exhaust line to *the exterior space* through the direct through-the-wall vent at a reduced temperature [said exhaust line comprising an airtight and flexible high temperature polymeric conduit with a continuous operating temperature above 200° F.,] and including control means for sensing the temperature of the water in the tank and controlling the amount of fuel supplied to the burner in response thereto, said control means activating and deactivating the blower and including means for sensing [the temperature of said reduced flue gases ] *either when said exhaust line is blocked or when flue gases spill outwardly of said flue gas collector* and for interrupting the fuel supplied to said burner in response thereto.

5. The water heater as defined in claim 4, wherein the direct through-the-wall vent conprises:

a. an insulated conduit for conveying the flue gases from the flue gas exhaust line through-the-wall;

b. a stationary [face plate ] *blocking means* which blocks direct horizontal access to the vent; and c. a hinged closure plate for blocking the conduit when no gases flow therethrough.

6. A water heater having exhaust means *for exhausting flue gases from an interior space to an exterior space and* adapted for installation through a through-the-wall vent formed in an upstanding wall, said *water* heater having an insulated water tank with a cold water inlet line, a hot water outlet line and a baffled flue pipe extending upwardly through the tank, said flue pipe opening at one end thereof upon a combustion chamber located beneath the tank, said combustion chamber containing a fuel burner, and the other end of said flue pipe opening at the top of the tank upon flue gas collection and exhaust means, said collection and exhaust means comprising a collection chamber [spaced ] *mounted to the top of the water heater and* above said flue pipe and a flexible flue gas exhaust line, [said exhaust line comprising an airtight and flexible high temperature polymeric conduit with a continuous operating temperature above 200° F., ] said exhaust line [having lower means] connected [thereto] to *blower means positioned at the top of the tank to* draw room air *from said interior space* into said collection chamber and said exhaust line along with flue gases *to dilute the flue gases and substantially eliminate condensation in the exhaust line* and to convey the *diluted* glue gases at a reduced temperature *by pushing the diluted flue gases along said exhaust line* to said through-the-wall vent *and then to said exterior space* , and including control means for sensing the temperature of the water in the tank and controlling the amount of fuel supplied to the burner in response thereto, said control means activating and deactivating the blower means [in response to the controlling of said fuel and wherein the direct through-the-wall vent comprises (a) an insultaed conduit for conveying the flue gases from the flue gas exhaust line through-the-wall;

(b) a stationary face plate which blocks direct access to the vent; and (c) a hinged closure plate for blocking the conduit when no gases flow therethrough] *and including means for detecting either when said exhaust line is blocked or when flue gases spill outwardly of said collection chamber.*

*7. The water heater as defined in claim 1 wherein the means for sensing senses the temperature of said reduced temperature flue gases.*

*8. The water heater as defined in claim 4 wherein the means for sensing senses the temperature of said reduced temperature flue gases.*

*9. The water heater as defined in claim 6 wherein the means for sensing senses the temperature of said reduced temperature flue gases.*

* * * * *